United States Patent
Bischoff

[11] Patent Number: 6,085,526
[45] Date of Patent: Jul. 11, 2000

[54] PROCESS AND BRAKING ARRANGEMENT FOR AN EXHAUST GAS TURBOCHARGER HAVING A VARIABLE TURBINE GEOMETRY

[75] Inventor: Roland Bischoff, Pluederhausen, Germany

[73] Assignee: DaimlerChrysler AG, Stuttgart, Germany

[21] Appl. No.: 09/283,250

[22] Filed: Apr. 1, 1999

[30] Foreign Application Priority Data

Apr. 1, 1998 [DE] Germany ............ 198 14 572

[51] Int. Cl.⁷ ............................................. F02B 37/12
[52] U.S. Cl. ................................. 60/602; 123/323
[58] Field of Search ..................... 60/602; 123/323

[56] References Cited

FOREIGN PATENT DOCUMENTS 195 31 861  11/1996  Germany .
195 43 190   5/1997  Germany .
WO 96/39573 12/1996  WIPO .

*Primary Examiner*—Noah P. Kamen
*Attorney, Agent, or Firm*—Evenson, McKeown, Edwards & Lenahan, PLLC

[57] ABSTRACT

In a process for adjusting an exhaust gas turbocharger having a variable turbine geometry in the engine braking operation, engine operating parameters are measured for determining an actuating signal influencing the position of the turbine geometry. In order to provide a brake performance maximum for all rotational speed ranges of the engine, the charging pressure in the intake pipes and the exhaust gas counterpressure in the exhaust gas pipes are measured as engine operating parameters in front of the exhaust gas turbocharger, a total pressure is determined as the sum of the charging pressure and the exhaust gas counterpressure, and the turbine geometry is adjusted to such an extent that the total pressure corresponds to a maximal pressure.

23 Claims, 1 Drawing Sheet

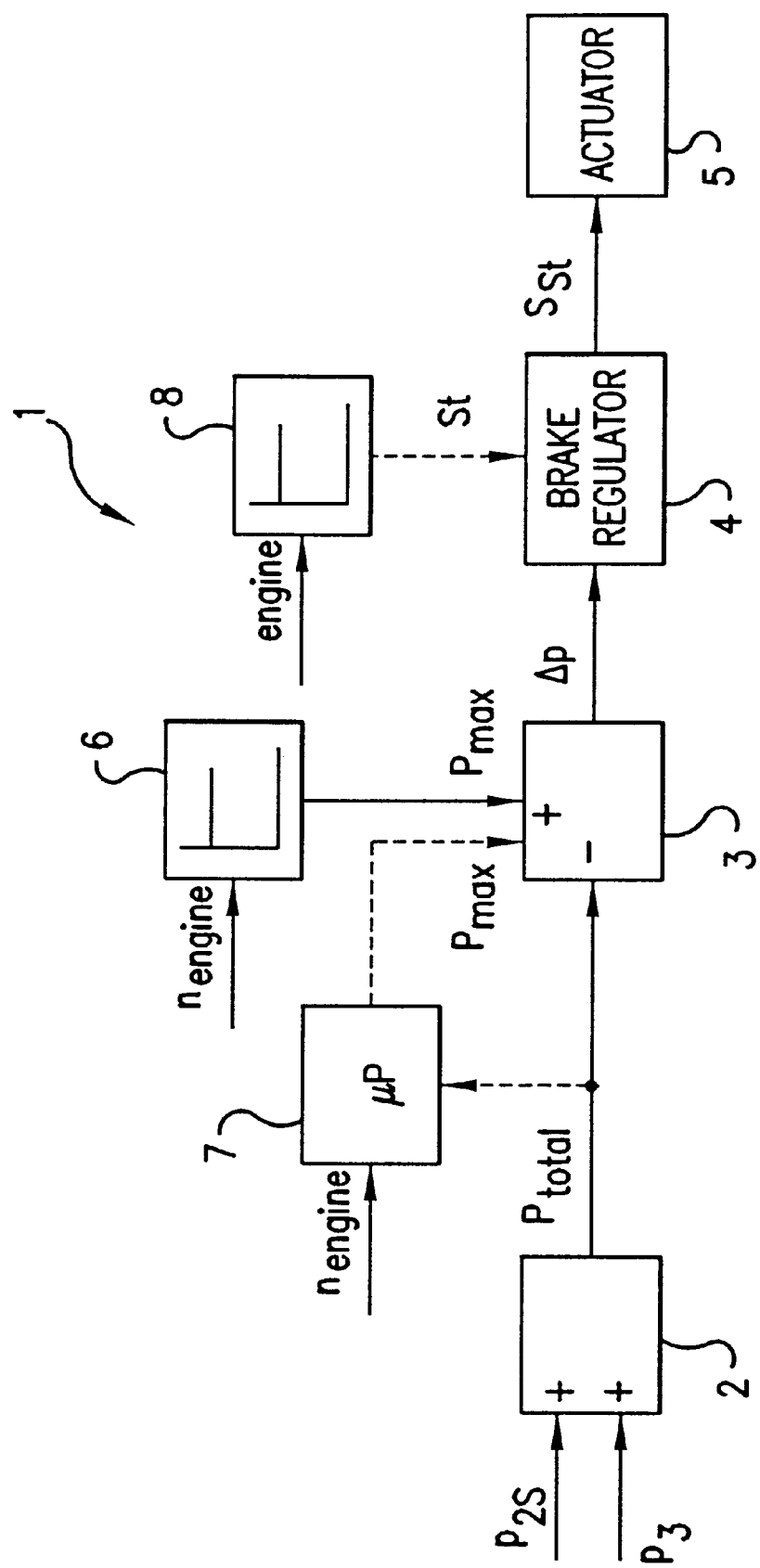

PROCESS AND BRAKING ARRANGEMENT FOR AN EXHAUST GAS TURBOCHARGER HAVING A VARIABLE TURBINE GEOMETRY

BACKGROUND AND SUMMARY OF THE INVENTION

This application claims the priority of German Application No. 198 14 572.1, filed Apr. 1, 1998, the disclosure of which is expressly incorporated by reference herein.

The invention relates to a process and a braking arrangement for an exhaust gas turbocharger having a variable turbine geometry in which an actuating signal influencing the position of the turbine geometry is determined.

From International Patent document WO 96/39573, a process is known for controlling the charging pressure in an internal-combustion engine charged via an exhaust gas turbocharger having an adjustable turbine geometry. In order to achieve a braking effect in the braking operation of the internal-combustion engine, the turbine geometry is changed into a ram position, in which the flow cross-section of the flow duct is reduced for building-up an exhaust gas counterpressure in the pipe section between the cylinders and the exhaust gas turbocharger. The exhaust gas flows at a high speed through the ducts between the guide blades of the turbine geometry and acts upon the turbine wheel, whereupon the compressor builds up an excess pressure in the intake pipes. As a result, the cylinder is acted upon on the input side by an increased charging pressure. On the output side, an excess pressure exists between the cylinder outlet and the exhaust gas turbocharger. This excess pressure counteracts the blowing-off or releasing of the air compressed in the cylinder by way of decompression valves into the exhaust gas pipes. In the braking operation, during the compression stroke, the piston must carry out compression work against the high excess pressure in the exhaust gas pipes, whereby a high braking effect is achieved.

In the case of the exhaust gas turbocharger known from this document, the braking performance is adjusted to a desired value using a brake regulator. As input quantities of the regulator, the position of the throttle valve in the intake pipes, the rotational engine speed, and the position of the brake pedal are detected, as well as additional quantities representing the operating condition of the vehicle such as the position of an external brake switch or the cruise control adjustment. An actuating signal is generated as an output quantity which acts upon an actuator for adjusting the guide blades of the turbine geometry.

Although this control makes it possible to bring the braking performance as a function of the engine operating temperature to a desired quantity or to a desired course, International Patent Document WO 96/39573 discloses no possibility for generating a maximum braking performance in order to achieve the shortest possible braking distance in order to maintain a constant speed, for example, on down grades.

From German Patent document DE 195 31 871 C1, a process is known for controlling, in the case of an internal-combustion engine charged via an exhaust gas turbocharger with an adjustable turbine geometry, the charging pressure to a defined operating-point-dependent desired value. According to German Patent document 195 31 871 C1, during the transient operation, particularly after a positive load change from low load and rotational speed ranges, control of the internal-combustion engine is improved by simple devices in that the difference between the exhaust gas counterpressure and the charging pressure is supplied to the control as an input quantity. However, German Patent document DE 195 31 871 C1 shows neither an engine braking operation for turbines having a variable turbine geometry in general, nor does this document disclose maximizing the engine braking performance.

The invention is based on the problem of providing a braking performance maximum for all rotational speed ranges of the engine.

According to the invention, this problem is solved by a process and braking arrangement for adjusting an exhaust gas turbocharger having a variable turbine geometry in the engine braking operation. In one embodiment, the charging pressure ($p_{2S}$) in the intake pipe and the exhaust gas counterpressure ($p_3$) in the exhaust gas pipes are measured as engine operating parameters in front of the exhaust gas turbocharger. The total pressure ($p_{total}$) is determined as the sum of the charging pressure ($p_{2S}$) and the exhaust gas counterpressure. The turbine geometry is adjusted to such an extent that the total pressure ($p_{total}$) corresponds to a maximal pressure ($p_{max}$).

In another embodiment, the rotational engine speed is measured as the engine operating parameter and a defined position of the turbine geometry is assigned to each rotational engine speed ($n_{engine}$), in which position, the total pressure ($p_{total}$), as the sum of the charging pressure ($p_{2S}$) and of the exhaust gas counterpressure ($p_3$), as well as the braking performance assume a maximum.

The braking arrangement according to the invention comprises an adder to which the charging pressure and the exhaust gas counterpressure can be supplied as input signals. A signal can be generated which represents the total pressure ($p_{total}$) as the sum of the charging pressure ($p_{2S}$) and the exhaust gas counterpressure ($p_3$). The signal representing the total pressure ($p_{total}$) can be supplied to a comparator in which the total pressure ($p_{total}$) can be compared with a maximal pressure ($p_{max}$) and a signal can be generated which represents a differential pressure ($\Delta p$) of the total pressure ($p_{total}$) and the maximal pressure ($p_{max}$). The signal representing the differential pressure ($\Delta p$) can be supplied to the brake regulator for generating the actuating signal ($S_{St}$).

The new process uses as a control criterion the sum of the charging pressure in the intake pipes and the exhaust gas counterpressure in the pipe section between the cylinder outlets and the exhaust gas turbocharger. The function of the sum of the charging pressure and the exhaust gas counterpressure extends approximately proportionally to the achievable braking performance so that, in the case of a maximum total pressure (formed of the sum of the charging pressure and the exhaust gas counterpressure), the braking performance maximum can also be found.

The total pressure as the sum of the charging pressure and the exhaust gas counterpressure forms a reliable criterion for determining the maximal braking performance.

As a result, it is possible to adjust a braking performance maximum for any rotational engine speed. A maximal pressure is assigned to each rotational engine speed, at which maximal pressure the braking performance reaches a maximum. During the braking operation, the actual rotational engine speed is detected and the actual total pressure is compared with a maximal pressure expediently for the actual rotational speed point and for certain rotational speed ranges. The turbine geometry is adjusted to such an extent that the total pressure corresponds to the maximal pressure. As soon as this is so, the actual total pressure will be at the maximally achievable value. Simultaneously, the braking performance maximum is reached for the actual value of the rotational speed or for the actual rotational speed range.

The maximal pressure can be determined ahead of time or can be determined in the engine running operation.

The maximal pressure can be determined ahead of time. Here, a reference motor is measured over the required rotational speed spectrum and a rotational-speed-dependent pressure curve, which represents the maximal pressure of the sum of the charging pressure and the exhaust gas counterpressure, is established and stored. The pressure curve for the maximal pressure can be used in the running engine operation in order to be able to make a rotational-speed-related comparison between the total pressure (as the sum of the measured charging pressure and the exhaust gas counterpressure) and the maximal pressure.

As a function of the deviation of the total pressure from the maximal pressure, actuating signals are generated in the braking arrangement. These actuating signals control the adjusting device of the turbine geometry. The position of the turbine geometry is changed until the total pressure and the maximal pressure correspond to one another. This construction has the advantage that the maximal pressure for all rotational speed ranges is known ahead of time and the process for adjusting the braking performance maximum can be carried out rapidly.

However, the maximal pressure can also be determined in the running engine operation. Here, the position of the turbine geometry is varied until the total pressure reaches a maximum. The determination of the maximum takes place mathematically in a computer unit of the braking arrangement. This construction has the advantage that the braking performance maximum can be adjusted very precisely because tolerances and spreads are compensated in the case of mass-produced engines.

According to another embodiment, a rotational-speed-dependent characteristic diagram is determined ahead of time for those positions of the guide blades of the turbine geometry for which a braking performance maximum occurs. A defined position of the turbine geometry is assigned to each rotational engine speed, which position corresponds to the braking performance maximum at this rotational speed. This construction has the advantage that the only required information for adjusting the braking performance maximum is the rotational engine speed. The measuring of the charging pressure and of the exhaust gas counterpressure can optionally be eliminated.

Mixed forms of the various embodiments are also contemplated. Thus, it may, for example, be expedient to determine the maximal pressure ahead of time and supply it to the braking arrangement as a rough value which is corrected in the running operation by way of a mathematical determination of the maximum of the measured charging pressure and exhaust gas counterpressure.

On the basis of the rotational engine speed, total pressure and maximal pressure information, the braking arrangement according to the invention generates those actuating signals which are required for an adjustment of the turbine geometry for reaching the maximal braking performance.

Other objects, advantages and novel features of the present invention will become apparent from the following detailed description of the invention when considered in conjunction with the accompanying drawings.

BRIEF DESCRIPTION OF THE DRAWING

The sole FIGURE is a block diagram of a braking arrangement according to the invention.

DETAILED DESCRIPTION OF THE DRAWING

The braking arrangement 1 comprises a brake regulator 4 for generating an actuating signal $S_{St}$ which can be supplied to an actuator 5 for acting upon the guide blades of an exhaust gas turbocharger (not shown). An adder 2 and a comparator 3 are connected in front of the brake regulator 4. The charging pressure $p_{2S}$ in the intake pipes of the internal-combustion engine and the exhaust gas counterpressure $p_3$ in the exhaust gas pipes between the cylinder outlet and the exhaust gas turbocharger are fed to the adder 2 as input signals and are added there to obtain the total pressure $p_{total}$. The total pressure $p_{total}$ is supplied to the comparator 3 as an input signal and is subtracted there from a maximal pressure $p_{max}$ supplied to the comparator 3 also as an input signal. The differential pressure $\Delta p$ between the maximal pressure $p_{max}$ and the overall pressure $p_{total}$ is supplied as a signal to the brake regulator 4 in which the actuating signal $S_{St}$ for the actuator 5 is generated from the differential pressure $\Delta p$.

The charging pressure, which is included in the determination of the total pressure, may be the charging pressure $p_{2S}$ in the intake pipes in the flow direction behind the charge air cooler as well as the charging pressure $p_2$ in front of the charge pressure cooler.

The maximal pressure $p_{max}$ is stored as a rotational-speed-dependent characteristic diagram in a memory unit 6. The rotational engine speed $n_{engine}$ is present as an input signal at the memory unit 6. As an output signal, the maximal pressure $p_{max}$ is generated which is assigned to the actual rotational engine speed $n_{engine}$. The maximal pressure $p_{max}$ is supplied to the comparator 3 and is compared there with the total pressure $p_{total}$.

In another embodiment, a computing unit 7 is provided as an alternative or in addition to the memory unit 6, in which computing unit 7 the maximal pressure $p_{max}$ is computed. The actual total pressure $p_{total}$ and the actual rotational engine speed $n_{engine}$ are supplied to the computing unit as input signals. In the computing unit 7, several successive total pressures $p_{total}$, which exist at a certain rotational engine speed but at different positions of the turbine geometry, are compared with one another and the maximum assigned to this rotational engine speed is determined by means of known methods. In order to obtain several total pressures from which the maximum can be computed, the position of the turbine geometry is varied via the actuator 5. As soon as the maximum has been found, the difference between the maximal pressure $p_{max}$ and the total pressure $p_{total}$ formed in the comparator 3 will be equal to zero so that the brake regulator 4 generates no actuating signals $S_{St}$ changing the turbine position and the turbine geometry remains in its position generating the maximal braking performance.

The variation of the turbine geometry position for determining the maximal pressure has the advantage that the control criterion formed of the sum of the charging pressure and of the exhaust gas counterpressure can be used independently of the type of construction for any exhaust gas turbocharger and for any engine. In the case of this iterative control process, an automatic search for the maximum of the pressure sum takes place during the braking operation. Without any mechanical stops or other limitations of the adjustment path for the variable turbine geometry and without the use of additional sensors, it is possible to carry out the adjustment of the variable turbine geometry corresponding to the desired braking operation using on software.

The memory unit 6 and the computing unit 7 may be combined with one another in that first a rough maximal pressure $p_{max}$ is read out as an initial value in the memory unit 6 and is used as the basis for determining an actuating signal. In the cycle which follows, the rough value is improved by a suitable iteration process in the computing unit 7.

By means of the process and by means of the device for measuring the charging pressure and the exhaust gas counterpressure as absolute pressures, the braking performance to be expected can be determined as a function of the grade level and can be displayed to the driver. As the grade level rises, the braking performance decreases. From the maximally achievable braking performance, the still permissible, correspondingly reduced down grade speed and/or a loading adapted to the geodetic level can be computed. If the permissible down grade speed is exceeded, safety-relevant vehicle/engine functions can be automatically activated.

According to another embodiment, a memory unit 8 communicates directly with the brake regulator 4. A rotational-speed-dependent characteristic diagram with the positions St of the turbine geometry is stored in the memory unit 8, in the case of which positions St, a braking performance maximum occurs. As a function of the actual rotational engine speed $n_{engine}$ supplied to the memory unit 8, the pertaining position St is determined from the characteristic diagram, which position St is supplied to the brake regulator 4 as an input signal. In the brake regulator 4, an actuating signal $S_{St}$ for the actuator 5 is generated directly from the information concerning the position St. The actuator 5 changes the turbine geometry into the position corresponding to the braking performance maximum.

In the case of this embodiment, the determination and processing of the charging pressure $p_{2S}$ and of the exhaust gas counterpressure $p_3$ are not necessary. The providing of the maximal pressure $p_{max}$ is also eliminated.

The process according to the invention, and the braking arrangement system, can be implemented using a computer unit such as a vehicle control unit operating under microprocessor control. The microprocessor can be appropriately programmed to perform the above-described process. Of course, the invention can also be implemented using a hard-wired circuit or some combination of both a microprocessor and hard-wired circuit.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for adjusting an exhaust gas turbocharger having a variable turbine geometry in an engine braking operation, the process comprising the acts of:
    measuring a charging pressure ($p_{2S}$) in an intake pipe of an engine;
    measuring an exhaust gas counterpressure ($p_3$) in exhaust gas pipes in front of the exhaust gas turbocharger;
    summing the charging pressure and exhaust gas counterpressure ($p_3$) to obtain a total pressure ($p_{total}$); and
    adjusting the variable turbine geometry such that the total pressure ($p_{total}$) corresponds to a maximal pressure ($p_{max}$).

2. The process according to claim 1, the process further comprising the acts of:
    measuring actual rotational engine speeds ($n_{engine}$); and
    assigning the maximal pressure ($p_{max}$) to be used in the adjusting act to each rotational engine speed ($n_{engine}$).

3. The process according to claim 1, further comprising the act of determining the maximal pressure ($p_{max}$) ahead of time as a defined value for comparison with the total pressure ($p_{total}$) in the adjusting act.

4. The process according to claim 2, further comprising the act of determining the maximal pressure ($p_{max}$) ahead of time as a defined value for comparison with the total pressure ($p_{total}$) in the adjusting act.

5. The process according to claim 3, wherein the act of adjusting the variable turbine geometry continuously varies the turbine geometry until the total pressure ($p_{total}$) and the maximal pressure ($p_{max}$) correspond to one another.

6. The process according to claim 4, wherein the act of adjusting the variable turbine geometry continuously varies the turbine geometry until the total pressure ($p_{total}$) and the maximal pressure ($p_{max}$) correspond to one another.

7. The process according to claim 1, further comprising the act of assigning a defined position of the variable turbine geometry to each value for the maximal pressure ($p_{max}$).

8. The process according to claim 1, further comprising the act of determining the maximal pressure ($p_{max}$) as a maximum value of the sum of the charging pressure ($p_{2S}$) and the exhaust gas counterpressure ($p_3$) during the engine operation by adjusting the turbine geometry.

9. A process for adjusting an exhaust gas turbocharger having a variable turbine geometry in an engine braking operation, the process comprising the acts of:
    measuring a rotational engine speed ($n_{engine}$) as an engine operating parameter; and
    assigning a defined position of the variable turbine geometry to each rotational engine speed ($n_{engine}$) in which position, a total pressure ($p_{total}$) resulting from a sum of a charging pressure ($p_{2S}$) and an exhaust gas counterpressure ($p_3$), as well as a braking performance, assumes a maximum.

10. A braking arrangement for an exhaust gas turbocharger having a variable turbine geometry, the arrangement comprising:
    a brake regulator which generates an actuating signal ($S_{St}$) as a function of measurable engine operating parameters;
    an actuator coupled to receive said actuating signal ($S_{St}$), said actuator being operable to change the variable turbine geometry into a ram position increasing an exhaust gas counterpressure;
    an adder which receives a charging pressure ($p_{2S}$) and the exhaust gas counterpressure ($p_3$) as input signals, said adder producing a total pressure ($p_{total}$) signal as a sum of the charging pressure ($p_{2S}$) and the exhaust gas counterpressure ($p_3$);
    a comparator receiving the total pressure ($p_{total}$) signal, said comparator comparing the total pressure ($p_{total}$) signal with a maximal pressure ($p_{max}$) and generating a differential pressure ($\Delta p$) signal of the total pressure ($p_{total}$) signal and the maximal pressure ($p_{max}$); and
    wherein the differential pressure ($\Delta p$) signal is provided as an input to the brake regulator to generate the actuating signal ($S_{St}$).

11. The braking arrangement according to claim 10, further comprising a memory unit in which the maximal pressure ($p_{max}$) is stored, said memory unit being coupled with the comparator.

12. The braking arrangement according to claim 11, further comprising a second memory unit in which positions of the variable turbine geometry which cause the maximal pressure ($p_{max}$) are stored as a rotational-speed-dependent characteristic diagram, said second memory unit coupling with the brake regulator.

13. The braking arrangement according to claim 11, further comprising a computing unit which determines the maximal pressure ($p_{max}$) as a maximum of a sum of the charging pressure ($p_{2S}$) and the exhaust gas counterpressure ($p_3$), said computing unit coupling with said comparator.

14. The braking arrangement according to claim 13, wherein a rotational engine speed ($n_{engine}$) signal is supplied to the memory unit, as well as the computing unit and second memory unit.

15. The braking arrangement according to claim 11, wherein the maximal pressure ($p_{max}$) is stored as a rotational-speed-dependent characteristic diagram in the memory unit.

16. The braking arrangement according to claim 15, further comprising a computing unit which determines the maximal pressure ($p_{max}$) as a maximum of a sum of the charging pressure ($p_{2S}$) and the exhaust gas counterpressure ($p_3$), said computing unit coupling with said comparator.

17. The braking arrangement according to claim 15, further comprising a second memory unit in which positions of the variable turbine geometry which cause the maximal pressure ($p_{max}$) are stored as a rotational-speed-dependent characteristic diagram, said second memory unit coupling with the brake regulator.

18. The braking arrangement according to claim 10, further comprising a computing unit which determines the maximal pressure ($p_{max}$) as a maximum of a sum of the charging pressure ($p_{2S}$) and the exhaust gas counterpressure ($p_3$), said computing unit coupling with said comparator.

19. The braking arrangement according to claim 18, further comprising a memory unit in which positions of the variable turbine geometry which cause the maximal pressure ($p_{max}$) are stored as a rotational-speed-dependent characteristic diagram, said memory unit coupling with the brake regulator.

20. The braking arrangement according to claim 10, further comprising a memory unit in which positions of the variable turbine geometry which cause the maximal pressure ($p_{max}$) are stored as a rotational-speed-dependent characteristic diagram, said memory unit coupling with the brake regulator.

21. A control system for adjusting turbine geometry of an exhaust gas turbocharger in an engine braking operation, comprising:

a sensor for sensing charge pressure in an intake pipe of an engine;

another sensor for sensing an exhaust gas counterpressure in an exhaust gas pipe in front of the exhaust gas turbocharger;

a control unit which sums the charging pressure and the exhaust gas counterpressure to obtain a total pressure;

wherein said control unit provides an actuating signal to adjust the variable turbine geometry such that the total pressure corresponds to a maximal pressure value.

22. The control system according to claim 21, wherein the control unit includes a table in which the maximal pressure for the sum of the charging pressure and the exhaust gas counterpressure is assigned to rotational engine speeds; and a sensor which measures the rotational engine speed such that the control unit can determine the maximal pressure.

23. A software product for operation with a microprocessor based control system for adjusting an exhaust gas turbocharger having a variable turbine geometry in an engine braking operation, the software product comprising:

a computer readable medium having stored thereon program code segments that:

obtain a total pressure value as a sum of a charging pressure value in an intake pipe and an exhaust gas counterpressure in an exhaust gas pipe in front of the exhaust gas turbocharger;

compare the total pressure value with a maximal pressure value to obtain a differential pressure value; and determine an actuating signal value based on the differential pressure value.

* * * * *